United States Patent
Becker et al.

(10) Patent No.: US 9,192,952 B2
(45) Date of Patent: Nov. 24, 2015

(54) CONTROL VALVE FOR AIRLESS SPRAYER PRESSURE ADJUSTMENT

(75) Inventors: Steve D. Becker, Blaine, MN (US); Glen W. Davidson, Roseville, MN (US); Bradley H. Hines, Andover, MN (US); Charles W. Dawson, Big Lake, MN (US); William M. Blenkush, Becker, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 229 days.

(21) Appl. No.: 13/990,723

(22) PCT Filed: Jan. 16, 2012

(86) PCT No.: PCT/US2012/021449
§ 371 (c)(1),
(2), (4) Date: May 30, 2013

(87) PCT Pub. No.: WO2012/097361
PCT Pub. Date: Jul. 19, 2012

(65) Prior Publication Data
US 2013/0256426 A1  Oct. 3, 2013

Related U.S. Application Data

(60) Provisional application No. 61/432,652, filed on Jan. 14, 2011.

(51) Int. Cl.
*B05B 7/02* (2006.01)
*B05B 9/04* (2006.01)
(Continued)

(52) U.S. Cl.
CPC ............... *B05B 9/04* (2013.01); *B05B 1/3046* (2013.01); *B05B 9/01* (2013.01); *B05B 9/0861* (2013.01);
(Continued)

(58) Field of Classification Search
CPC .... B05B 1/3046; B05B 9/01; B05B 15/0283; B05B 15/001; B05B 9/0866; B05B 9/04; B05B 9/0861; F04B 49/24; F04B 1/122; Y10T 137/9247
USPC .......................................... 239/525, 526, 583
See application file for complete search history.

(56) References Cited

U.S. PATENT DOCUMENTS 5,609,300 A  3/1997  Conatser
5,699,967 A  12/1997  Conatser
(Continued)

FOREIGN PATENT DOCUMENTS

WO  2010047800 A2  4/2010

OTHER PUBLICATIONS

International Search Report, mailed Aug. 31, 2012.

*Primary Examiner* — Steven J Ganey
(74) *Attorney, Agent, or Firm* — Kinney & Lange, P.A.

(57) ABSTRACT

A control valve for a fluid dispensing device comprises a valve stem, a valve body, a cap and an adjustment mechanism. The elongate valve stem has a flange. The valve body comprises a valve bore in which the elongate valve stem is configured to translate, and a flow path intersecting the valve bore and into which the valve stem penetrates. The cap is joined to the valve body to receive the valve stem such that the flange is positioned between the valve body and the cap. The adjustment mechanism changes a position of the cap with respect to the valve body to vary a distance between the cap and the flange which adjusts the force, and thereby the pressure at which the valve opens.

29 Claims, 7 Drawing Sheets

(51) Int. Cl.
  *B05B 15/00* (2006.01)
  *B05B 1/30* (2006.01)
  *B05B 15/02* (2006.01)
  *B05B 9/01* (2006.01)
  *B05B 9/08* (2006.01)
  *F04B 1/12* (2006.01)
  *F04B 49/24* (2006.01)

(52) U.S. Cl.
  CPC ........... *B05B 15/001* (2013.01); *B05B 15/0283* (2013.01); *F04B 1/122* (2013.01); *F04B 49/24* (2013.01); *B05B 9/0866* (2013.01); *Y10T 137/9247* (2015.04)

(56) References Cited

U.S. PATENT DOCUMENTS 7,883,026 B2 * 2/2011 Micheli .................. 239/525
8,596,555 B2 * 12/2013 Thompson et al. ........... 239/526

* cited by examiner

CONTROL VALVE FOR AIRLESS SPRAYER PRESSURE ADJUSTMENT

BACKGROUND

The present invention is related to liquid dispensing systems. In particular, the present invention relates to airless sprayers for dispensing paints, varnishes and the like.

Paint sprayers are well known and popular for use in painting of surfaces, such as on architectural structures, furniture and the like. Airless paint sprayers provide a high quality finish due to their ability to finely atomize liquid paint. These airless paint sprayers are typically coupled to a paint source, include a pumping mechanism that draws in the paint, and include a small, shaped orifice through which the paint is discharged. The pumping mechanisms are typically driven by an electric motor, which is operator actuated by a trigger. Airless paint sprayers are capable of pressurizing liquid paint to upwards of 3,000 psi [pounds per square inch] (~20.7 MPa). Due to these high pressures, paint sprayers often include a relief valve positioned between the pumping mechanism and the discharge orifice.

A conventional relief valve comprises a simple spring-biased valve that opens at an overpressure condition. Additionally, the valve can be manually actuated to prime the pumping mechanism and to relieve pressure and drain paint after operation is completed.

Some airless sprayers have complex, separate pressure control devices, such as an electronic transducer, a bourdon tube, or a spring-loaded pressure-actuated piston, to activate an electrical switch to turn on/off the motor. For example, fluid delivery systems have been outfitted with Bourdon tubes to provide a visual indication of pressure. In other designs, a bourdon tube, or other pressure transducer, is provided that automatically turns the drive motor off when a threshold pressure level is exceeded, such as described in U.S. Pat. No. 5,292,232 to Krohn et al, which is assigned to Graco Inc. Spraying is thus interrupted while pressure within the system rebalances as the motor turns off and on, resulting in varying system pressure, potentially diminishing the quality of the sprayed finish. There is, therefore, a need for improving control over spray parameters in airless sprayers; in particular, one providing essentially continuous control of pressure without costly and/or complex components, and light in weight for hand-held applications.

SUMMARY

The present invention is directed to a control valve for a fluid dispensing device. The control valve comprises an elongate valve stem, a valve body, a cap and an adjustment mechanism. The elongate valve stem has a flange. The valve body comprises a valve bore in which the elongate valve stem is configured to translate, and a flow path intersecting the valve bore and into which the valve stem penetrates. The cap is joined to the valve body to receive the valve stem such that the flange is positioned between the valve body and the cap. The adjustment mechanism changes a position of the cap with respect to the valve body to vary a distance between the cap and the flange which adjusts the spring force, and thereby the pressure at which the valve opens.

DETAILED DESCRIPTION

Figure 1:
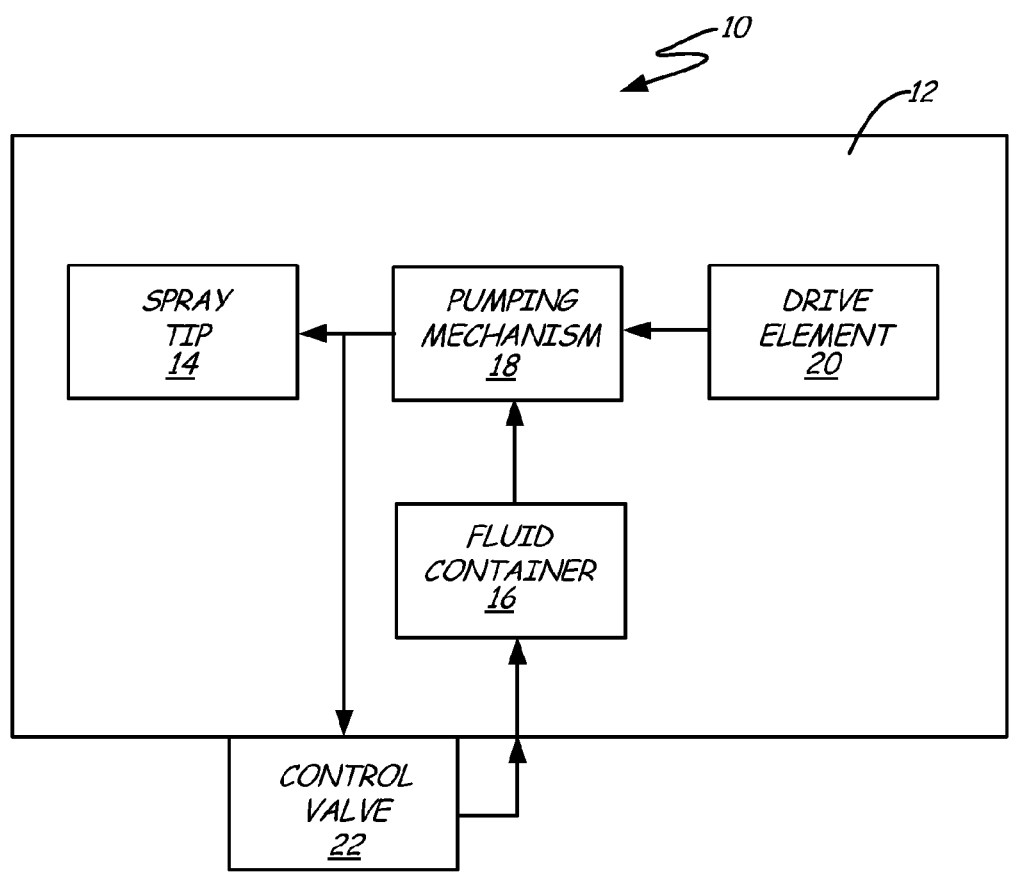
FIG. 1 shows a block diagram of the main components of an airless fluid dispensing device in which a control valve of the present invention may be used.

FIG. 1 shows a block diagram of portable airless fluid dispensing device 10 in which the control valve of the present invention may be used. In the embodiment shown, device 10 comprises a portable airless spray gun comprising housing 12, spray tip assembly 14, fluid container 16, pumping mechanism 18, drive element 20 and control valve 22. In various embodiments of the invention, spray tip assembly 14, fluid container 16, pumping mechanism 18, drive element 20 and control valve 22 are packaged together in a portable spraying system. For example, spray tip assembly 14, fluid container 16, pumping mechanism 18, drive element 20 and control valve 22 can each be mounted directly to housing 12 to comprise an integrated handheld device, as described with respect to FIGS. 2 and 3. However, in other embodiments, any type of spraying system may be used with control valve 22.

Spray gun 10 comprises an airless dispensing system in which pumping mechanism 18 draws fluid from container 16 and, with power from drive element 20, pressurizes the fluid for atomization through spray tip assembly 14. Pumping mechanism 18 comprises, in different embodiments, a gear pump, a piston pump, a plunger pump, a vane pump, a rolling diaphragm pump, a ball pump, a rotary lobe pump, a diaphragm pump or a servo motor having a rack and pinion drive. Drive element 20 comprises, in different embodiments, an electric motor, an air-driven motor, a linear actuator or a gas engine which can be used to drive a crankshaft, cams, a wobble plate or rocker arms. In various embodiments, pumping mechanism 18 generates orifice spray pressure, or running pressure, from about 360 pounds per square inch [psi] (~2.48 MPa) up to about 3,000 psi (~20.7 MPa), or higher. Control valve 22 of the present invention permits an operator to adjust pressures and flow rates generated by pumping mechanism 18 independent of the speed of pumping mechanism 18.

Figure 2:
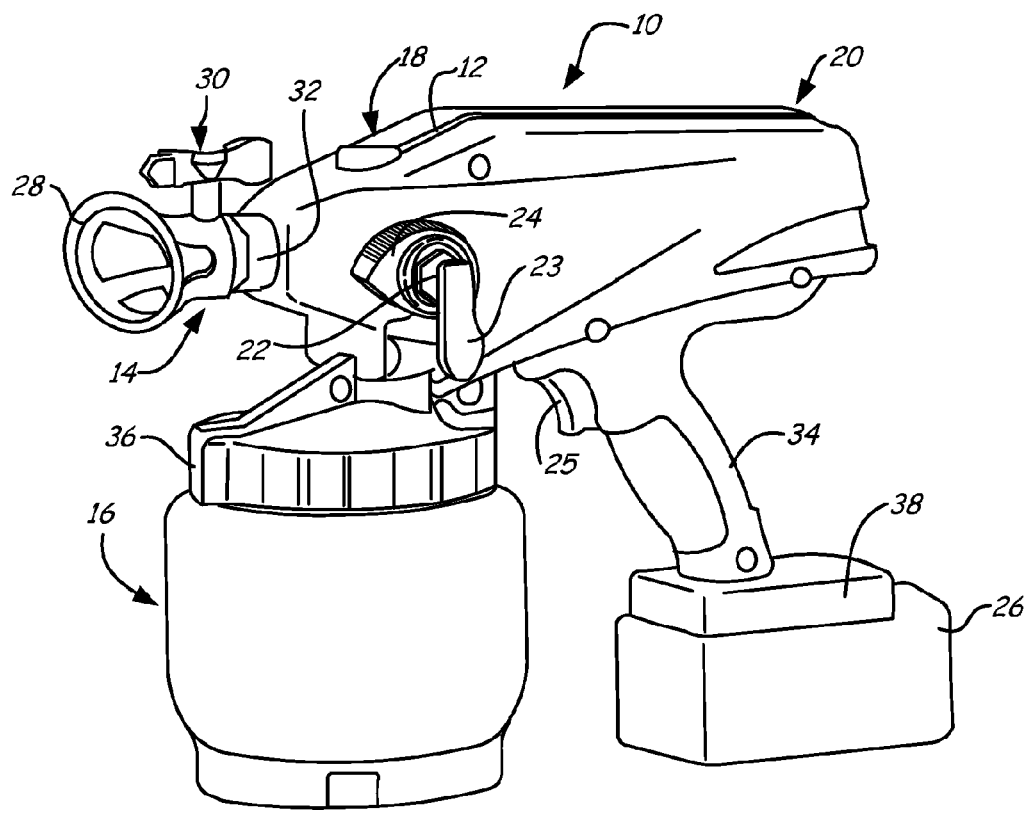
FIG. 2 shows a side perspective view of a handheld sprayer embodiment of the dispensing device of FIG. 1 including a control valve of the present invention.

FIG. 2 shows a side perspective view of spray gun 10 having housing 12, spray tip assembly 14, fluid container 16, pumping mechanism 18 (FIG. 3), drive element 20 (FIG. 3) and control valve 22. Control valve 22 includes lever 23 and knob 24. Spray gun 10 also includes trigger 25 and battery 26. Spray tip assembly 14 includes guard 28, spray tip 30 and connector 32. Drive element 20 and pumping mechanism 18 are disposed within housing 12. Housing 12 includes integrated handle 34, container lid 36 and battery port 38.

Fluid container 16 is provided with a fluid that is desired to be sprayed from spray gun 10. For example, fluid container 16 is filled with a paint or varnish that is fed to spray tip assembly 14 through coupling with lid 36. Battery 26 is plugged into battery port 38 to provide power to drive element 20 within housing 12. Trigger 25 is connected to battery 26 and drive element 20 such that upon actuation of trigger 25 a power input is provided to pumping mechanism 18. Pumping mechanism 18 draws fluid from container 16 and provides pressurized fluid to spray tip assembly 14. Connector 32 couples spray tip assembly 14 to pump 18. Tip guard 28 is connected to connector 32 to prevent objects from contacting high velocity output of fluid from spray tip 30. Spray tip 30 is inserted through bores within tip guard 28 and connector 32 and includes a spray orifice that receives pressurized fluid from pumping mechanism 18. Spray tip assembly 14 provides a highly atomized flow of fluid to produce a high quality finish. Control valve 22 of the present invention permits an operator to, among other things, open pumping mechanism 18 to atmospheric pressure using lever 23, and adjust the maximum spray pressure of spray gun 10 using knob 24.

Figure 3:
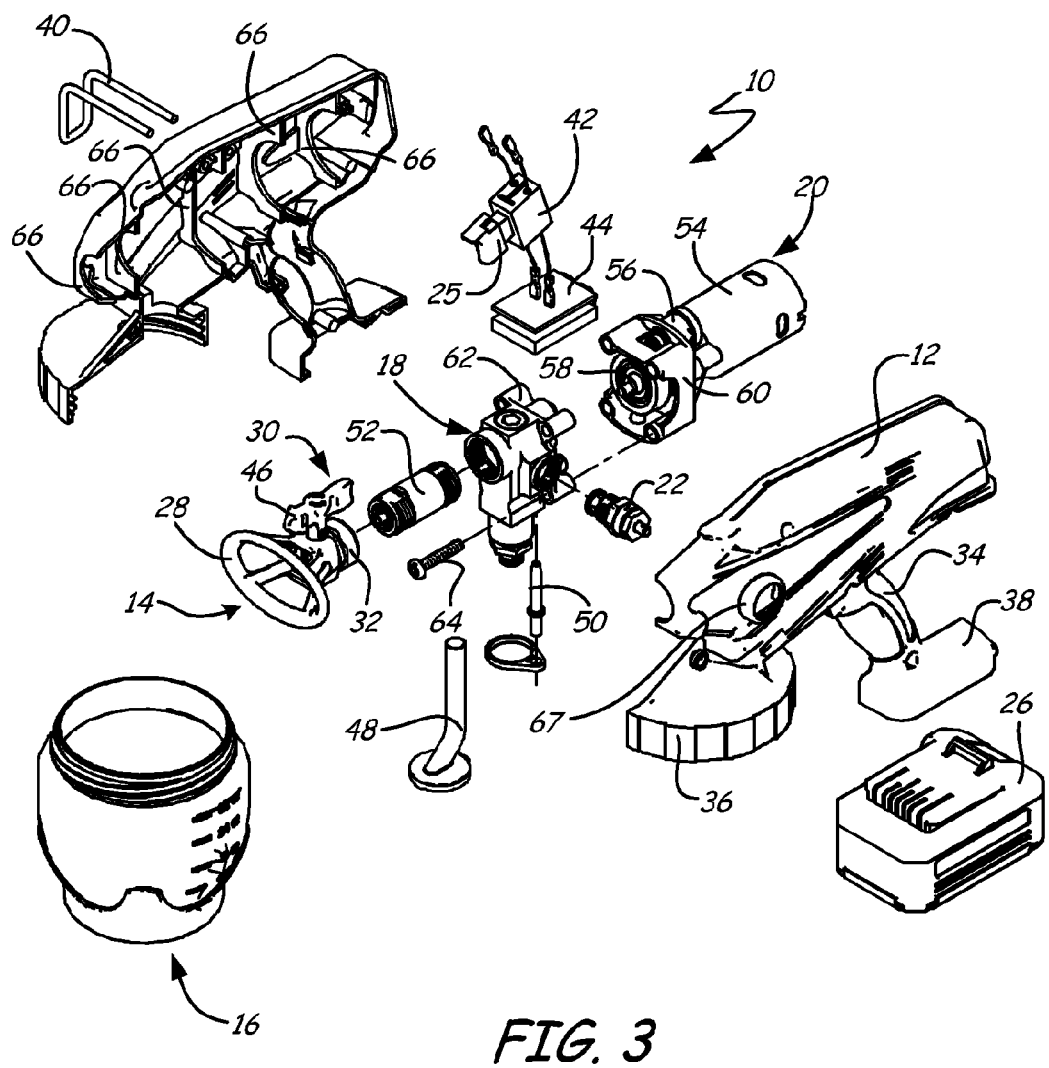
FIG. 3 shows an exploded view of the handheld sprayer of FIG. 2, showing a housing, a spray tip assembly, a fluid cup, a pumping mechanism, a drive element and the control valve.

FIG. 3 shows an exploded view of spray gun 10 having housing 12, spray tip assembly 14, fluid container 16, pumping mechanism 18, drive element 20 and control valve 22. Spray gun 10 also includes trigger 25, battery 26, clip 40, switch 42 and circuit board 44. Spray tip assembly 14 includes guard 28, spray tip 30, connector 32 and barrel 46. Pumping mechanism 18 includes suction tube 48, return line 50 and valve 52. Drive element 20 includes motor 54, gearing assembly 56 and wobble drive assembly 58. Housing 12 includes integrated handle 34, container lid 36 and battery port 38.

Pumping mechanism 18, drive element 20, gearing 56, wobble drive assembly 58 and valve 52 are mounted within housing 12 and supported by various brackets. For example, gearing 56 and wobble drive assembly 58 include bracket 60 which connects to housing 62 of pumping mechanism 18 using fasteners 64. Valve 52 is threaded into housing 62, and connector 32 of spray tip 30 is threaded onto valve 52. Spray tip 30, valve 52, pumping mechanism 18 and drive element 54 are supported within housing 12 by ribs 66. Switch 42 is positioned above handle 34 and circuit board 44 is positioned below handle 34 such that trigger 25 is ergonomically positioned on housing 12. Switch 42 includes terminals for connecting with drive element 20, and battery 26 is supported by port 38 of housing 12 in such a manner so as to connect with circuit board 44. Battery 26 may comprise a Lithium battery, a Nickel battery, a Lithium-ion battery or any other suitable rechargeable battery. In one embodiment, battery 26 comprises a 18 VDC battery, although other lower or higher voltage batteries can also be used. Fluid container 16 is threaded into lid 36 of housing 12. Suction tube 48 and return line 50 extend from pumping mechanism 18 into fluid container 16. Clip 40 allows gun 10 to be conveniently stowed such as on a belt of an operator or a storage rack.

To operate spray gun 10, fluid container 16 is filled with a liquid to be sprayed from spray tip 30. Trigger 25 is actuated by an operator to activate drive element 20. Drive element 20 draws power from battery 26 and causes rotation of a shaft connected to gearing 56. Gearing 56 causes wobble drive 58 to provide an actuation motion to pumping mechanism 18. Pumping mechanism 18 draws liquid from container 16 using suction tube 48. Air in the pump, or fluid flow greater than needed, is returned to container 16 through control valve 22 and return line 50. Pressurized liquid from pumping mechanism 18 is provided to valve 52. Once a threshold pressure level is achieved, valve 52 opens to allow pressurized liquid into barrel 46 of spray tip 30. Barrel 46 includes a spray orifice that atomizes the pressurized liquid as the liquid leaves spray tip 30 and gun 10. Barrel 46 may comprise either a removable spray tip that can be removed from tip guard 28, or a reversible spray tip that rotates within tip guard 28. Control valve 22 is inserted through access flange 67 and connected to pumping mechanism 18 to provide 1) a priming valve, 2) a rapid depressurization valve, 3) a safety valve and 4) a pressure adjustment valve.

Figure 4:
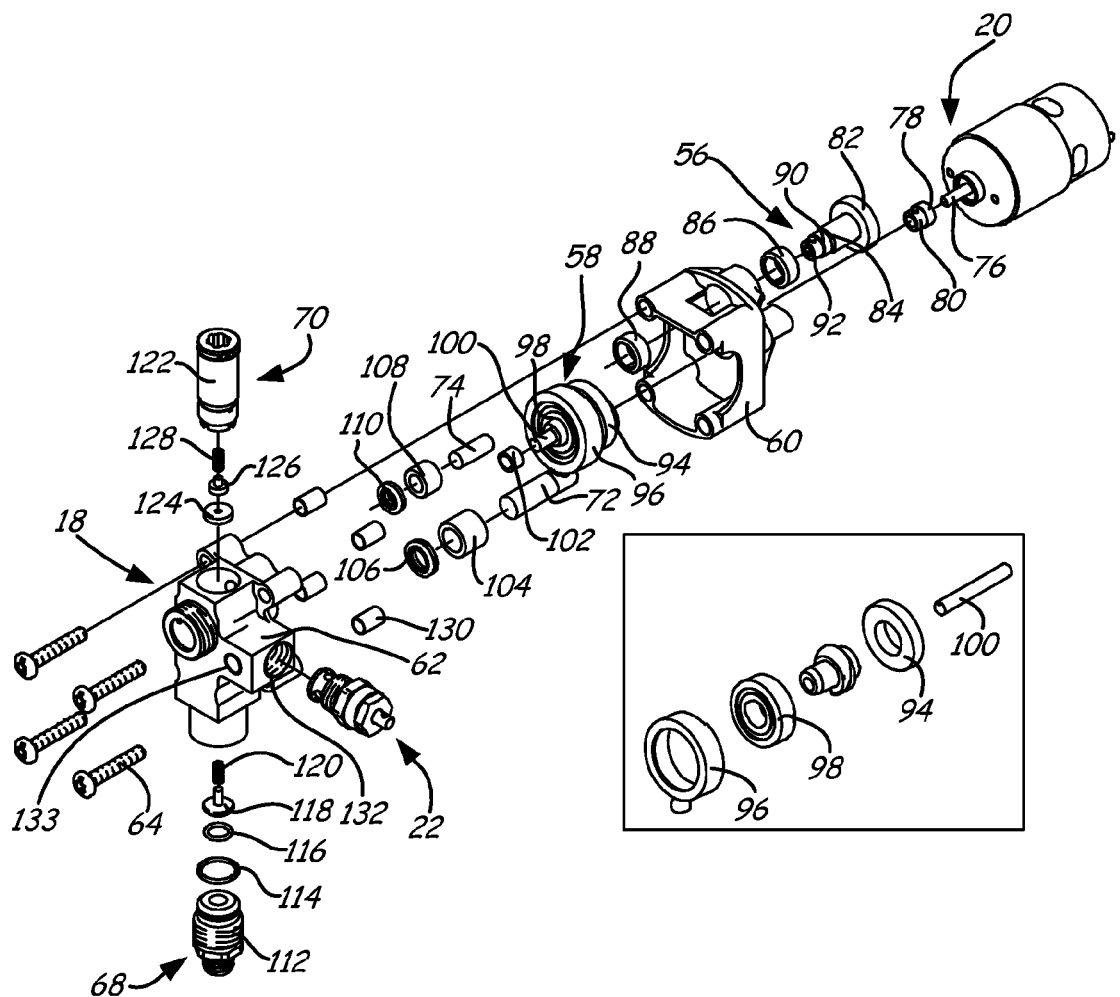
FIG. 4 shows an exploded view of the pumping mechanism and drive element of FIG. 3.

FIG. 4 shows an exploded view of pumping mechanism 18 and drive element 20 of FIG. 3. Pumping mechanism 18 includes housing 62, fasteners 64, inlet valve assembly 68, outlet valve assembly 70, first piston 72 and second piston 74. Drive element 20 includes drive shaft 76, first gear 78, first bushing 80, second gear 82, shaft 84, first bushing 86, third bushing 88, third gear 90, fourth bushing 92 and fourth gear 94. Wobble drive mechanism 58 includes connecting rod 96, bearing 98, rod 100 and sleeve 102. First piston 72 includes first piston sleeve 104 and first piston seal 106. Second piston 74 includes second piston sleeve 108 and second piston seal 110. Inlet valve 68 includes inlet valve cartridge 112, seal 114, seal 116, inlet poppet valve 118 and inlet spring 120. Outlet valve 70 includes outlet valve cartridge 122, seat 124, outlet poppet valve 126 and outlet spring 128.

Drive shaft 76 is inserted into bushing 80 such that gear 78 rotates when drive element 20 is activated. Bushings 86 and 88 are inserted into a receiving bore within bracket 60, and shaft 84 is inserted into bushings 86 and 88. Gear 82 is connected to a first end of shaft 84 to mesh with gear 78, and gear 90 is connected with a second end of shaft 84 to mesh with gear 94. Sleeve 102 is inserted into a receiving bore within housing 62 and rod 100 is inserted into sleeve 102 to support wobble drive mechanism 58. Bearing 98 connects rod 100 to connecting rod 96. Connecting rod 96, which comprises a ring with a stud, couples with first piston 72. First piston 72 and second piston 74 are inserted into piston sleeves 104 and 108, respectively, which are mounted within pumping chambers within housing 62. Valve seals 106 and 110 and sleeves 104 and 108 seal the pumping chambers. Fasteners 64 are inserted through bores in housing 62 and bushings 130 and threaded into housing 60. Inlet valve cartridge 112 is inserted into a receiving bore in bracket 62. Inlet spring 120 biases poppet valve 118 against cartridge 112. Similarly, outlet valve cartridge 122 is inserted into a receiving bore in housing 62 such that outlet spring 128 biases poppet valve 126 against seat 124. Seals 114 and 116 prevent fluid from leaking out of valve 68, and seat 124 prevents fluid from leaking out of valve 70. Control valve 22 is inserted into receiving bore 132 in housing 62 to intersect fluid flow from pistons 72 and 74 and to intersect vent 133. Vent 133 can be positioned on an underside of housing 62 for coupling to return line 50 as shown in FIG. 3. Control valve 22 is adjustable to permit an operator to manually set the maximum pressure that will be generated within pumping mechanism 18.

Figure 5:
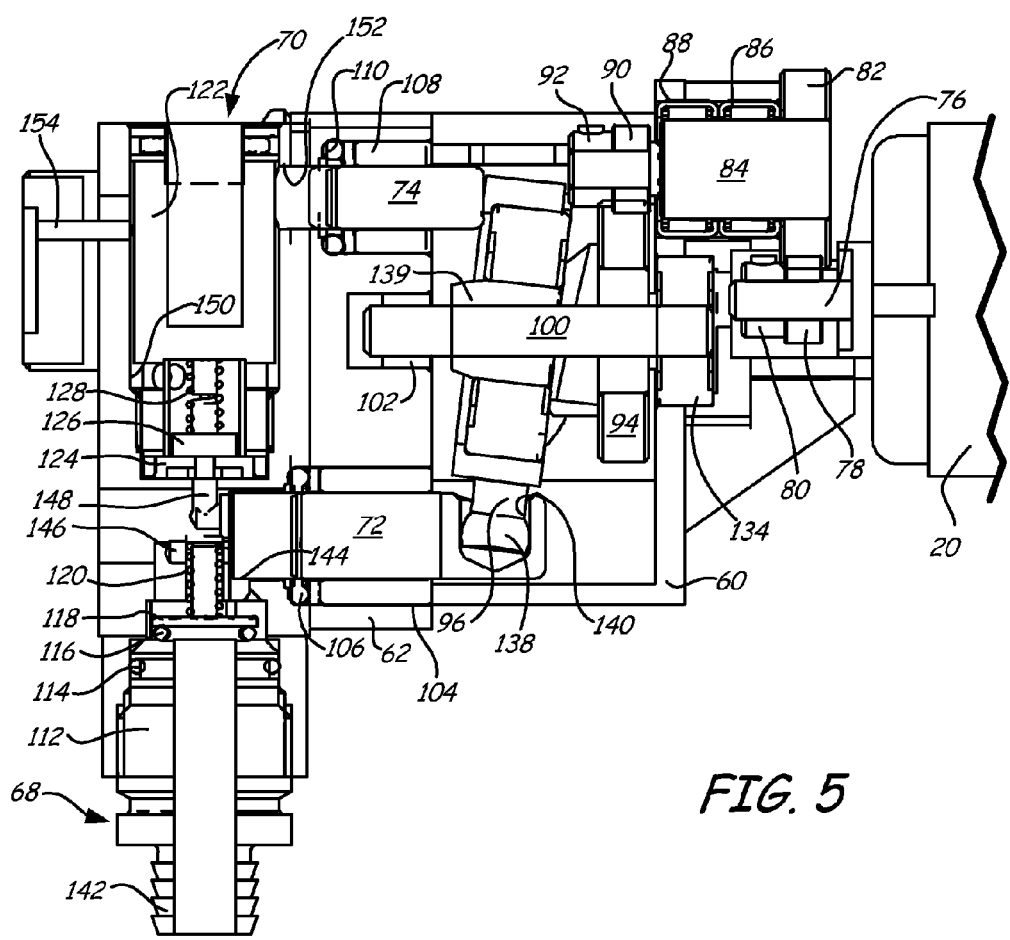
FIG. 5 shows a cross-sectional view of an assembled pumping mechanism and drive element.

FIG. 5 shows a cross-sectional view of pumping mechanism 18 assembled with drive element 20. Drive element 20 comprises a mechanism or motor for producing rotation of drive shaft 76. In the embodiment shown, drive element 20 comprises a DC (direct current) motor that receives electrical input from battery 26, or another electrical power source. In other embodiments, drive element comprises an AC (alternating current) motor that receives electrical input from a power outlet or a pneumatic motor that receives compressed air as an input. Pumping mechanism 18 comprises a dual piston pump. In other embodiments, pumping mechanism 18 may comprise a double-displacement single piston pump, a gerotor (generated rotor), a gear pump or a rotary vane pump.

First gear 78 is fit over drive shaft 76 and is held in place by bushing 80. Bushing 80 is secured to shaft 76 using a setscrew or another suitable means. First gear 78 meshes with second gear 82, which is connected to shaft 84. Shaft 84 is supported in bracket 60 by bushings 86 and 88. Gear 90 is disposed on a reduced diameter portion of shaft 84 and secured in place using bushing 92. Bushing 92 is secured to shaft 84 using a setscrew or another suitable means. Gear 90 meshes with gear 94 to rotate rod 100. Rod 100 is supported by sleeve 102 and bushing 134 in housings 62 and 60, respectively. Gears 78, 82, 90 and 94 provide a gear reduction means that slows the input to rod 100 from the input provided by drive element 20.

Rotation of rod 100 produces linear motion of ball 138 of connecting rod 96 through wobble of hub 139. Ball 138 is mechanically connected to socket 140 of piston 72. Thus, connecting rod 96 directly actuates piston 72 in both advanced and retracted positions. Piston 72 advances and retracts within piston sleeve 104 in housing 62. As piston 72 retreats from the advanced position, fluid is drawn into valve 68. Valve 68 includes stem 142 to which suction tube 48 connects. Suction tube 48 is submerged within a liquid inside fluid container 16 (FIG. 3). The liquid is drawn into pumping chamber 144 around poppet valve 118 and through inlet 146. Poppet valve 118 is biased against valve cartridge 112 by spring 120. Seal 116 prevents fluid from passing between cartridge 112 and poppet valve 118 when poppet valve 118 is closed. Seal 114 prevents fluid from passing between cartridge 112 and housing 62. Valve stem 118 is drawn away from cartridge 112 by suction produced by piston 72. As piston 72 advances, fluid within pumping chamber 144 is pushed through outlet 148 toward valve 70.

Fluid pressurized in chamber 144 is pushed into pressure chamber 150 around poppet valve 126 of valve 70. Poppet valve 126 is biased against seat 124 by spring 128. Seat 124 prevents fluid from passing between poppet valve 126 and housing 62 when valve 126 is closed. Poppet valve 126 is forced away from housing 62 as piston 72 moves toward the advanced position, as spring 120 and the pressure generated by piston 72 closes valve 68. Pressurized fluid from pumping chamber 144 fills pressure chamber 150, comprising the space between cartridge 122 and housing 62, and pumping chamber 152. The pressurized fluid also forces piston 74 to the retracted position. The volume displaced by the advance of piston 72 is larger than the displacement of piston 74. As such, a single stroke of piston 72 provides enough fluid to fill pumping chamber 152 and maintain pressure chamber 150 filled with pressurized fluid. Additionally, piston 72 has a large enough volume to push pressurized fluid through outlet 154 of housing 62.

As piston 72 retreats to draw additional fluid into pumping chamber 144, piston 74 is pushed forward by connecting rod 96. Piston 74 is disposed within piston sleeve 108 in housing 62, and piston seal 110 prevents pressurized fluid from escaping pumping chamber 152. Piston 74 advances to evacuate fluid pushed into pumping chamber 152 by piston 72. The fluid is pushed back into pressure chamber 150 and through outlet 154 of housing 62, but is prevented by valve 70 from entering chamber 148. Piston 72 and piston 74 operate out of phase with each other. For the specific embodiment shown, piston 74 is one-hundred eighty degrees out of phase with piston 72 such that when piston 74 is at its most advanced position, piston 72 is at its most retracted position. Operating out of phase, pistons 72 and 74 operate in synch to provide a continuous flow of pressurized liquid to pressure chamber 150 while also reducing vibration in spray gun 10. Pressure chamber 150 acts somewhat as an accumulator to provide a more constant flow of pressurized fluid to outlet 154 such that a continuous flow of liquid can be provided to valve 52 and spray tip assembly 14 (FIG. 3). Receiving bore 132 (FIG. 4) of housing 62 extends to intersect pressure chamber 150. Control valve 22 is inserted in receiving bore 132 and is configured to automatically open when pressures generated by pumping mechanism 18 in pressure chamber 150 exceed a threshold level set by control valve 22 or when manually actuated.

Figure 6:
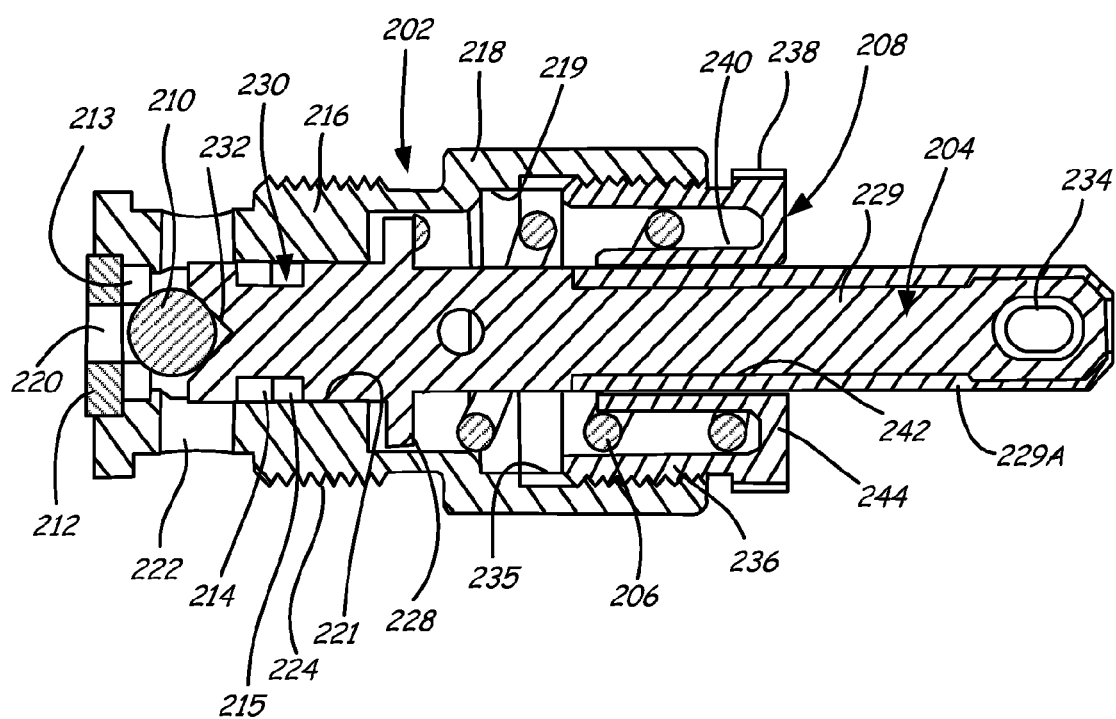
FIG. 6 shows a cross-sectional view of a control valve used in the pumping mechanism of FIGS. 3-5.

FIG. 6 shows a cross-sectional view of control valve 22 used in pumping mechanism 18 of FIGS. 3-5. Control valve 22 includes housing 202, plunger 204, spring 206, cap 208, ball 210, gasket 212, seat 213, O-ring seal 214 and backup ring 215. Body 202 comprises base 216, cup 218, spring bore 219, inlet bore 220, stem bore 221, outlet bore 222 and body threads 224. Plunger 204 comprises flange 228, stem 229 with non-conductive coating 229A, seal seat 230, ball guide 232 and lever bore 234. Cap 208 comprises cap threads 235, outer sleeve 236, scalloped rim 238, inner sleeve 240, which defines valve bore 242, and end wall 244.

Using body threads 224, annular valve body 202 is threaded into receiving bore 132 (FIG. 4) of housing 62 to intersect pressure chamber 150 (FIG. 5). Inlet bore 220 is fluidly coupled to pressure chamber 150 and is therefore exposed to the fluid pressure generated by pumping mechanism 18. Outlet bore 222 extends through body 202 to align with a vent, such as vent 133, in housing 62 to receive return line 50 (FIG. 3), which extends into fluid container 16 (FIG. 3). As such, a complete circuit is formed between fluid container 16, suction tube 48, pumping mechanism 18, pressure chamber 150, relief valve 22 and return line 50.

Plunger 204 is inserted into stem bore 221 through cup 218 such that flange 228 is disposed within spring bore 219 and stem 229 extends through and out of cup 218. Spring bore 219 comprises a larger diameter extension of stem bore 221. Seat 213 is disposed between housing 62 and body 202 within inlet bore 220. Gasket 212 is pushed into inlet bore 220 to maintain assembly of seat 213 and ball 210 within valve body 202. When control valve 22 is fully assembled, ball guide 232 of plunger 204 holds ball 210 against seat 213 to prevent fluid from pressure chamber 150 from passing through inlet bore 220 and into outlet bore 222. O-ring seal 214 is positioned within seal seat 230 between body 202 and plunger 204 to prevent fluid within bore 222 from entering bore 219 when plunger 204 is retraced from seat 213. Backup ring 215, which comprises a split ring or washer, is positioned around valve stem 229 to prevent extrusion of o-ring 214 into stem bore 221. Spring 206 is positioned within bore 219 to push against flange 228 and cap 208. Cap threads 235 on outer sleeve 236 of cap 208 are threaded into bore 219 on cup 218 such that stem 229 extends into inner sleeve 240 and through end wall 244. Cap 208 comprises a spring retainer that puts spring 206 in compression to bias plunger 204 toward seat 213 and housing 62. As discussed below, knob 24 and lever 23 (shown in FIGS. 2, 7A and 7B) are slipped over valve stem 229. Knob 24 engages scalloped rim 238 and lever 23 couples to lever bore 234.

Figure 7A:
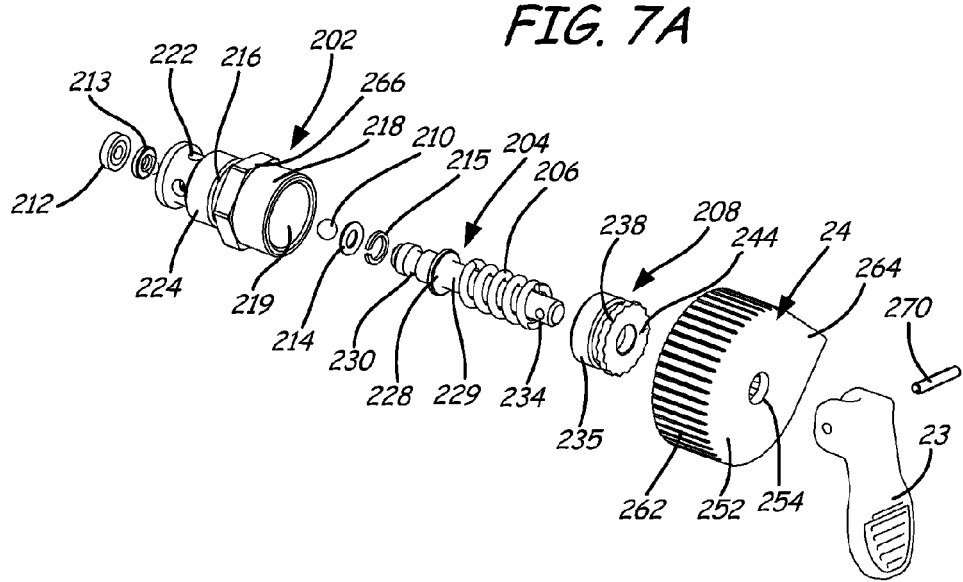
FIG. 7A shows an exploded view of the control valve of FIGS. 2-6 from an exterior perspective.
Figure 7B:
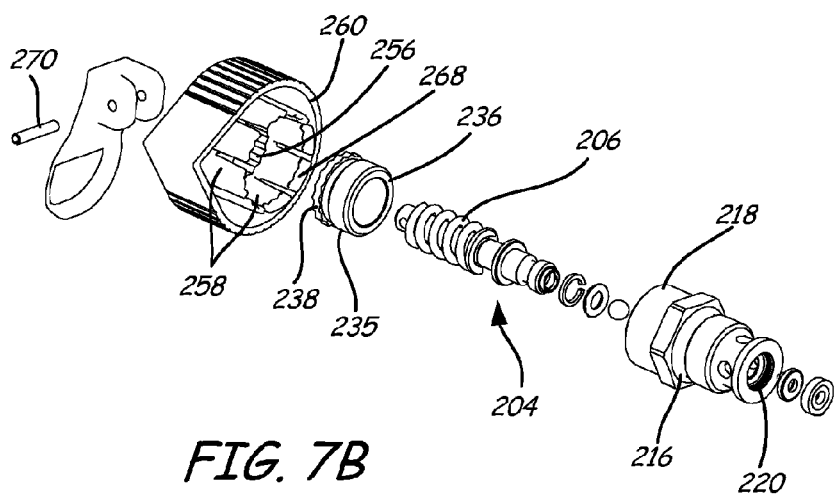
FIG. 7B shows an exploded view of the control valve of FIGS. 2-6 from an interior perspective.

Valve 22 provides priming means for pumping mechanism 18. Upon initiating a new use of spray gun 10, before fluid has filled pumping mechanism 18, it is necessary to purge air from within spray gun 10 before buildup of pressure is possible. Lever 23 (FIG. 1; FIGS. 7A & 7B), which is connected to stem 204 by a pin at bore 234, can be pushed or pulled by an operator to withdraw plunger away from seat 212 via cam action with face 252 which causes ball 210 to disengage from seat 213. Thus, upon activation of pumping mechanism 18, air from within spray gun 10 is displaced by fluid from container 16 and purged from spray gun 10 through vent 133. Likewise, as fluid begins to flow from container 16, control valve 22 re-circulates the fluid back to container 16. When lever 23 is released, valve 52 (FIG. 3) will open upon appropriate fluid pressure to keep fluid pressure to spray tip 14 consistent.

Valve 22 also provides a means for rapidly depressurizing spray gun 10 after use. For example, after operation of spray gun 10 when drive element 20 has ceased operating pumping mechanism 18, pressurized fluid remains within spray gun 10. It is, however, desirable to depressurize spray gun 10 such that spray gun 10 can be disassembled and cleaned. Thus, displacement of lever 23 opens valve 22 to drain pressurized fluid within pumping mechanism to container 16 and to release any stored potential energy within spray gun 10.

Valve 22 also comprises a safety valve to prevent pumping mechanism 18 from becoming over-pressurized. Depending on the preload setting of spring 206, plunger 204 will be displaced when pressure within pressure chamber 150 reaches a desired threshold level. At such level, pressure chamber 150 is fluidly connected to bore 222 to allow liquid within pressure chamber 150 to travel into vent 133. Thus, the liquid is returned to container 16 and can be recycled by pumping mechanism 18.

Notably, this response also allows the valve to be used as a control for the spraying pressure delivered to tip 14. Here, cap 208 of valve 22 comprises an adjustment mechanism that permits variation of the compression induced in spring 206, thereby changing the maximum pressure that can be generated by pumping mechanism 18. In the embodiment shown, cap threads 235 on outer sleeve 236 engage internal threads on cup 218 to permit cap 208 to be rotated to adjust its position relative to base 216 and flange 228. In other embodiments, other mechanisms can be used, such as a bimodal button mechanism that adjusts the compression of spring 206 between two settings. In one embodiment, valve 22 can be configured to open up anywhere between 1,000 psi (~6.9 MPa) and 3,000 psi (~20.7 MPa). In the described embodiment, knob 24 (FIG. 1; FIGS. 7A & 7B) is adjusted to rotate outer sleeve 236 within cup 218 to adjust the spring compression.

FIG. 7A shows an exploded view of control valve 22 of FIGS. 2-6 from an exterior perspective. FIG. 7B shows an exploded view of control valve 22 of FIGS. 2-6 from an interior perspective. FIGS. 7A and 7B are discussed concurrently. Control valve 22 comprises body 202, plunger 204, spring 206, cap 208, ball 210, gasket 212, seat 213, O-ring seal 214 and backup ring 215. Body 202 comprises base 216, cup 218, spring bore 219, inlet bore 220, outlet bore 222 and body threads 224. Plunger 204 comprises flange 228, stem 229, seal seat 230 and lever bore 234. Cap 208 comprises cap threads 235, outer sleeve 236, scalloped rim 238, inner sleeve 240, which defines valve bore 242, and end wall 244. Knob 24 comprises end face 252, stem bore 254, scalloped ring 256, pliable fingers 258 and dial 260. Dial 260 includes grips 262 and indicator 264. Valve body 202 includes faceted surface 266.

Outer sleeve 236 of cap 208 is threaded into cup 218 of valve body 202. Knob 24 is coupled to cap 208 via a spline connection that permits relative axial movement, but that prevents relative rotational movement. Specifically, scalloped ring 256 of end face 252 slide into engagement with scalloped rim 238 of cap 208. As such, knob 24 is locked into circumferential engagement with cap 208. With ring 256 and rim 238 engaged, pliable fingers 258 are pushed across cup 218 and over faceted surface 266. Pliable fingers 258 deflect radially outwardly to hug the radially outer perimeter of faceted surface 266. However, sufficient force can be used to overcome the force of pliable fingers 258 to rotate fingers 258 circumferentially across surface 266, or to remove knob 24 axially from cap 208. Specifically, pliable fingers 258 can be situated into a plurality of preset positions along faceted surface 266, as discussed below. Axial movement of knob 24 is limited by the retention of the pin 270 and lever 23.

Pliable fingers 258 provide tactile indications of the position of cap 208 such that an operator can move knob 24 in even increments. In the embodiment shown, faceted surface 266 comprises a hexagonal cross-sectional area providing six flat surfaces and six edges against which pliable fingers 258 engage. Specifically, the interior facing surfaces of pliable fingers 258 include crenellations that are shaped to engage the edges of faceted surface 266. In the embodiment shown, eight pliable fingers 258 include sixteen crenellations plus an additional eight spaces between the fingers that produce a total of twenty-four positions of pliable fingers 258 relative to faceted surface 266. In such an embodiment, however, knob 24 is restricted to rotating 270 degrees such that eighteen adjustments, thus, nineteen positions are provided. Indicator 264 provides a visual indication to an operator of the position of cap 208 relative to valve body 202. Indications can be provided on housing 12 (FIG. 1) to provide a visual representation of the position of knob 24, of pressure or of flow.

With ring 256 and rim 238 fully seated, the shoulders in tabs 268 abut the end of cup 218 to provide a solid base for the actuation of lever 23. Spring 206 is compressed between flange 228 and end wall 244 to push ball 210 into seat 213 in inlet bore 220. Valve stem 229 extends through valve bore 242 on cap 208 and bore 254 on knob 24, and pin 270 is used to secure lever 23 at bore 234. Dial 260 of knob 24 is spaced from pliable fingers 258 to permit access flange 67 (FIG. 3) from housing 12 to be inserted therebetween to provide a coarse seal.

As discussed above, outer sleeve 236 of cap 208 can be rotated to adjust the engagement of external threads 235 with internal threads of cup 218. Unscrewing of cap 208 retracts end wall 244 away from flange 228 and base 216, thereby relieving compression of spring 206. Dial 260, through the scalloped engagement of rim 238 and ring 256, is provided for an operator to easily rotate cap 208. Specifically, dial 260 includes grips 262 to enable knob 24 to be easily rotated, such as when wet. When knob 24 is rotated such that cap 208 is fully threaded into cup 218, spring 206 is compressed to its maximum level. As such, a greater amount of pressure must be generated within pressure chamber 150 to open control valve 22. When knob 24 is rotated such that cap 208 is fully retreated from cup 218, spring 206 is compressed to its minimum level. As such, a lesser amount of pressure must be generated within pressure chamber 150 to open control valve 22. Any pressure generated within pressure chamber 150 greater than the force generated by spring 206, will retract ball 210 away from seat 213, causing fluid to pass through vent 133 and into return line 50 and fluid container 16. Thus, spraying from spray gun 10 can continue without interruption below the threshold level determined by control valve 22. At the minimum level, more fluid will be recycled to container 16 then at the maximum level for any given over-pressure condition.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. For example, there are other ways knob 24 could be elastically held so it provides tactile feedback to the person adjusting control valve 24, and to help knob 24 resist inadvertent repositioning, including features which provide interaction with sprayer housing 12. Also, the scallops of knob 24 and cap 208 work together such that rotations of knob 24 are translated to cap 208. This radial connection between these parts could instead be axial features, such as pins and sockets; matching and opposing pins, cogs, dogs; matching radiating facets; etc. Therefore, it is intended that the invention not be limited to the particular embodiment(s) disclosed, but that the invention will include all embodiments falling within the scope of the appended claims.

The invention claimed is:

1. A valve comprising:
    a valve stem having a flange;
    a valve housing comprising:
        a valve bore in which the valve stem is configured to translate; and
        a flow path intersecting the valve bore and into which the valve stem penetrates;
    a cap joined to the valve housing to receive the valve stem such that the flange is positioned between the valve housing and the cap;
    a spring positioned between the flange and the cap to bias the valve stem toward the valve housing;
    a cup having:
        a first end connected to the valve housing;
        a second end coupled to the cap; and
        a middle portion extending between the first and second ends to surround the valve stem;
    an adjustment mechanism that changes a position of the cap with respect to the valve housing to vary a distance between the cap and the flange.

2. The valve of claim 1 wherein the cap comprises:
    an end wall through which the valve stem extends;
    an outer sleeve extending from the end wall to engage the cup; and
    an inner sleeve extending from the end wall to surround the valve stem;
    wherein the spring is disposed between the flange and the end wall, and the outer sleeve and the inner sleeve.

3. The valve of claim 1 wherein the adjustment mechanism comprises:
    a threaded engagement between the cap and the valve housing.

4. The valve of claim 3 wherein the adjustment mechanism further comprises:
    a knob comprising:
        a spline connection with the cap; and
        a detent connection with the valve housing.

5. The valve of claim 4 wherein:
    the cap further comprises:
        a scalloped rim disposed about an exterior of the cap; and
    the knob further comprises:
        an end face having a bore for receiving the valve stem;
        a scalloped ring embedded in the end face surrounding the bore and engaged with the scalloped rim to form the spline connection;
        a plurality of pliable fingers surrounding the scalloped ring and extending from the end face to engage the valve housing; and
        a dial extending from the end face to shroud the plurality of pliable fingers;
    wherein rotation of the dial causes the scalloped ring to rotate the cap through the scalloped rim and causes the plurality of pliable fingers to slip over the valve housing.

6. The valve of claim 5 wherein the dial further comprises:
    an indicator so that a position of the knob relative to the valve housing can be determined; and
    a plurality of grip enhancing features.

7. The valve of claim 5 wherein the valve housing further comprises:
    a faceted surface over which the plurality of pliable fingers slide.

8. The valve of claim 1 wherein the valve housing includes external threads for coupling the valve to a threaded bore.

9. A valve assembly comprising:
    an annular housing comprising:
        first and second end walls;
        a sidewall connecting the first and second end walls;
        an axially extending inlet bore extending between the first end wall and the second end wall;
        a discharge bore extending from the inlet bore to the sidewall; and
        a cup extending from the first end wall to surround the inlet bore at the first end;
    a plunger positioned within the inlet bore, the plunger comprising:
        a valve stem; and
        a flange extending from the valve stem and disposed within the cup;
    a cap comprising:
        an adjustable engagement with the cup; and
        a bore through which the valve stem extends; and
    a spring compressed between the cap and the flange to bias the valve stem toward the annular housing, wherein the adjustable engagement varies the compression of the spring to adjust force required to move the valve stem.

10. The valve assembly of claim 9 and further comprising:
    a knob comprising:
        a spline connection with the cap; and
        a detent connection with the valve housing;
    wherein the adjustable engagement comprises a threaded coupling between the cap and the cup.

11. The valve assembly of claim 10 and further comprising:
    a faceted surface comprising a portion of the sidewall;
    a pair of mating corrugated surfaces located on the cap and the knob to form the spline connection; and
    a plurality of fingers extending from the cap to engage the faceted surface and form the detent connection.

12. The valve assembly of claim 9 wherein the cap comprises:
    an end wall through which the valve stem extends;
    an outer sleeve extending from the end wall to engage the cup; and
    an inner sleeve extending from the end wall to surround the valve stem;
    wherein the spring is disposed between the flange and the end wall, and the outer sleeve and the inner sleeve.

13. The valve assembly of claim 9 and further comprising:
    a fluid dispensing device comprising:
        a pump for pressurizing a fluid;
        a drive element for supplying power to the pump;
        a spray tip for receiving pressurized fluid from the pump; and
        a housing in which the pump, drive element and spray tip are disposed;
    wherein the annular housing is joined to the housing such that the inlet bore is fluidly coupled between the pump and the spray tip.

14. The valve assembly of claim 13 and further comprising:
a fluid container coupled to the housing;
a suction tube fluidly coupling the fluid container to the pump; and
a return line connecting the discharge bore to the container.

15. An airless fluid dispensing device comprising:
a pump for directly pressurizing a fluid;
a drive element for supplying power to the pump;
a spray tip including:
   a pressure actuated, spring-biased ball valve configured to open under pressurized fluid from the pumping mechanism; and
   an orifice element connected to ball valve to atomize the pressurized fluid; and
a control valve fluidly disposed between the pump and the spray tip, the control valve comprising:
   a valve stem having a flange;
   a valve housing comprising:
      a valve bore in which the elongate valve stem is configured to translate; and
      a flow path intersecting the valve bore and into which the valve stem penetrates;
   a cap joined to the valve housing to receive the valve stem such that the flange is positioned between the valve housing and the cap;
   a spring positioned between the flange and the cap to bias the valve stem toward the valve housing; and
   an adjustment mechanism that changes a position of the cap with respect to the valve body to vary a distance between the cap and the flange.

16. The fluid dispensing device of claim 15 wherein the adjustment mechanism further comprises:
a knob comprising:
   a spline connection with the cap; and
   a detent connection with the valve housing.

17. The fluid dispensing device of claim 15 wherein the pump further comprises:
first and second cylinders having first and second chambers, respectively;
first and second pistons disposed in the first and second chambers, respectively;
a pressure chamber disposed between the spray tip and the pump, the pressure chamber fluidly connected to the first chamber and the second chamber;
an inlet valve disposed between the first chamber and a fluid source; and
an outlet valve disposed between the first chamber and the pressure chamber;
wherein the valve bore of the control valve intersects the pressure chamber.

18. A valve comprising:
a valve stem having a flange;
a valve housing comprising:
   a valve bore in which the valve stem is configured to translate; and
   a flow path intersecting the valve bore and into which the valve stem penetrates;
a cap joined to the valve housing to receive the valve stem such that the flange is positioned between the valve housing and the cap, wherein the cap further comprises a scalloped rim disposed about an exterior of the cap;
an adjustment mechanism that changes a position of the cap with respect to the valve housing to vary a distance between the cap and the flange, wherein the adjustment mechanism comprises:
   a threaded engagement between the cap and the valve housing;
   a knob comprising:
      a spline connection with the cap;
      a detent connection with the valve housing;
      an end face having a bore for receiving the valve stem;
      a scalloped ring embedded in the end face surrounding the bore and engaged with the scalloped rim to form the spline connection;
      a plurality of pliable fingers surrounding the scalloped ring and extending from the end face to engage the valve housing; and
      a dial extending from the end face to shroud the plurality of pliable fingers; and
   wherein rotation of the dial causes the scalloped ring to rotate the cap through the scalloped rim and causes the plurality of pliable fingers to slip over the valve housing.

19. The valve of claim 18 wherein the dial further comprises:
an indicator so that a position of the knob relative to the valve housing can be determined; and
a plurality of grip enhancing features.

20. The valve of claim 18 wherein the valve housing further comprises:
a faceted surface over which the plurality of pliable fingers slide.

21. A valve comprising:
a valve stem having a flange;
a valve housing comprising:
   a valve bore in which the valve stem is configured to translate; and
   a flow path intersecting the valve bore and into which the valve stem penetrates;
a cap joined to the valve housing to receive the valve stem such that the flange is positioned between the valve housing and the cap;
an adjustment mechanism that changes a position of the cap with respect to the valve housing to vary a distance between the cap and the flange; and
wherein the valve housing includes external threads for coupling the valve to a threaded bore.

22. The valve of claim 21 wherein the adjustment mechanism comprises:
a threaded engagement between the cap and the valve housing.

23. The valve of claim 22 wherein the adjustment mechanism further comprises:
a knob comprising:
   a spline connection with the cap; and
   a detent connection with the valve housing.

24. The valve of claim 23 wherein:
the cap further comprises:
   a scalloped rim disposed about an exterior of the cap; and
the knob further comprises:
   an end face having a bore for receiving the valve stem;
   a scalloped ring embedded in the end face surrounding the bore and engaged with the scalloped rim to form the spline connection;
   a plurality of pliable fingers surrounding the scalloped ring and extending from the end face to engage the valve housing; and
   a dial extending from the end face to shroud the plurality of pliable fingers;
wherein rotation of the dial causes the scalloped ring to rotate the cap through the scalloped rim and causes the plurality of pliable fingers to slip over the valve housing.

25. The valve of claim 24 wherein the dial further comprises:
   an indicator so that a position of the knob relative to the valve housing can be determined; and
   a plurality of grip enhancing features.

26. The valve of claim 24 wherein the valve housing further comprises:
   a faceted surface over which the plurality of pliable fingers slide.

27. The valve of claim 23 and further comprising a spring positioned between the flange and the cap to bias the valve stem toward the valve housing.

28. The valve of claim 27 wherein the valve housing further comprises:
   a cup having:
      a first end connected to the valve housing;
      a second end coupled to the cap; and
      a middle portion extending between the first and second ends to surround the valve stem.

29. The valve of claim 28 wherein the cap comprises:
   an end wall through which the valve stem extends;
   an outer sleeve extending from the end wall to engage the cup;
   an inner sleeve extending from the end wall to surround the valve stem; and
   wherein the spring is disposed between the flange and the end wall, and the outer sleeve and the inner sleeve.

* * * * *